Patented Dec. 1, 1942

2,303,517

UNITED STATES PATENT OFFICE 2,303,517

MANUFACTURE OF DERIVATIVES OF PHENANTHRIDINE

Leslie Percy Walls, Teddington, and Gilbert Thomas Morgan, deceased, late of Teddington, England, by Frank Herbert Bell, executor, Teddington, England No Drawing. Original application January 5, 1939, Serial No. 249,528. Divided and this application September 26, 1941, Serial No. 412,504. In Great Britain January 13, 1938

2 Claims. (Cl. 260—288)

This application is a division of application Ser. No. 249,528, filed Jan. 5, 1939, and now matured into Patent 2,267,988, granted Dec. 30, 1941.

This invention relates to quaternary salts of the phenanthridine series having valuable trypanocidal properties and to processes for their manufacture.

We have found that the 3-acetylamino-9-(4'-acetyl-aminophenyl)-10-alkylphenanthridinium salts possess a noteworthy trypanocidal potency which could not have been foreseen from their constitution.

The starting material for these salts is an acylated ortho-xenylamine containing two nitro groups; ring closure of this to the corresponding phenanthridine derivative is effected through the agency of phosphorus oxychloride, preferably in the presence of an inert liquid of high boiling point, such as nitrobenzene. The reaction is as follows:

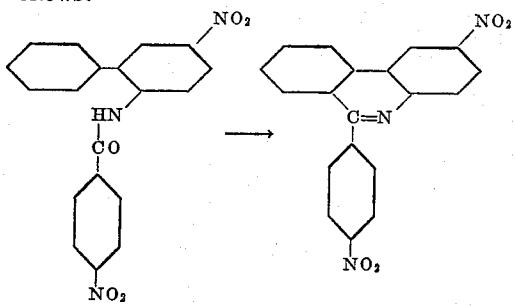

The nitro-compound is reduced by a standard method to the amine, the latter is acetylated and then condensed with methyl para-toluene sulphonate or similar alkylating agent to yield quaternary salts such as

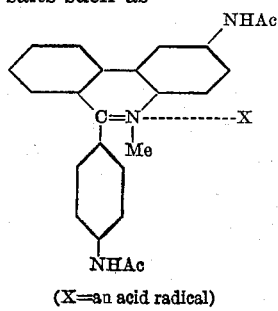

(X=an acid radical)

Alternatively, the nitro-compound produced by condensation of the xenylamine derivative may be converted into a quaternary salt which is then reduced to form the quaternary salt of the amino-compound and acetylated.

The following example illustrates the invention; the parts are by weight and the temperatures in degrees centigrade:

A mixture of 20 parts of 2-p-nitrobenzamido-5-nitrodiphenyl (prepared by the condensation in pyridine of 5-nitro-2-xenylamine and p-nitrobenzoyl chloride) and 40 parts of phosphorus oxychloride was heated for 30 hours; excess of oxychlorine was removed by pouring cautiously into water, and the solid product was collected by filtration. Crystallisation of this product from pyridine gave very pure 3-nitro-9-(4'-nitrophenyl)-phenanthridine, M. P. 294°, in good yield. On reduction with hydrogen (under 5 atmospheres pressure and with a platinic oxide catalyst) in an autoclave, 3-amino-9-(4'-aminophenyl)-phenanthridine, M. P. 233°, was obtained, which gave a diacetyl derivative, M. P. 328°. The latter was caused to react with methyl p-toluene sulphonate in hot nitrobenzene, and after steam distillation of the latter, a yellow crystalline quaternary chloride was salted out with sodium chloride from the aqueous liquor; this chloride dissolved in water to a neutral solution, and possessed trypanocidal properties.

We claim:

1. As a new article of manufacture, a quaternary 3-acetylamino-9-(4'-acetylaminophenyl)-10-alkylphenanthridinium salt, which quaternary salt is soluble in water and has trypanocidal properties.

2. As a new article of manufacture, the quaternary salt 3-acetylamino-9-(4'-acetylaminophenyl)-10-methylphenanthridinium chloride which salt is a yellow crystalline solid, dissolves in water to a neutral solution and has trypanocidal properties.

LESLIE PERCY WALLS.
FRANK HERBERT BELL,
Executor of the last will and testament of Gilbert Thomas Morgan, deceased.